United States Patent
Evans et al.

(10) Patent No.: US 9,518,608 B2
(45) Date of Patent: Dec. 13, 2016

(54) BEARING ASSEMBLY WITH A RETAINING RING AND METHOD THEREOF

(71) Applicant: Schaeffler Technologies GmbH & Co. KG, Herzogenaurach (DE)

(72) Inventors: Matthew Evans, Warren, MI (US); Kate Higdon, Royal Oak, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/458,786

(22) Filed: Aug. 13, 2014

(65) Prior Publication Data

US 2015/0055907 A1    Feb. 26, 2015

Related U.S. Application Data

(60) Provisional application No. 61/868,892, filed on Aug. 22, 2013.

(51) Int. Cl.
*F16C 35/06* (2006.01)
*F16C 33/58* (2006.01)
(Continued)

(52) U.S. Cl.
CPC ............ *F16C 35/077* (2013.01); *F16C 19/24* (2013.01); *F16C 25/08* (2013.01); *F16C 33/58* (2013.01);
(Continued)

(58) Field of Classification Search
CPC ....... F16C 35/067; F16C 35/07; F16C 35/073; F16C 35/077; F16C 43/04; F16C 33/58; F16C 33/586; F16C 33/60; F16C 19/06; F16C 19/24; F16C 2202/20; F16B 21/18; F16B 21/183; F16B 21/186; Y10T 29/49689
See application file for complete search history.

(56) References Cited

U.S. PATENT DOCUMENTS

| 119,232 A * | 9/1871 | Jones | ..................... E21B 10/42 |
| | | | 279/105 |
| 2,316,498 A * | 4/1943 | Biczak, Jr. | ............. A63C 17/22 |
| | | | 301/5.7 |

(Continued)

FOREIGN PATENT DOCUMENTS

| DE | 102011004414 | 8/2012 |
| GB | 1497151 | 1/1978 |

(Continued)

*Primary Examiner* — Alan B Waits
(74) *Attorney, Agent, or Firm* — Simpson & Simpson, PLLC

(57) ABSTRACT

A bearing assembly, including a housing with a first circumferentially disposed groove; a bearing including an outer race with a second circumferentially disposed groove; and a retaining ring disposed within the first and second circumferentially disposed grooves. A method of retaining a bearing, including: locating a first portion of a ring within a groove in an outer race; installing a housing radially about the race to contact the race; locating a second portion of the ring within a groove in the housing; bringing temperature of the housing and the race to a first level; fixing, with contact between the race and the housing, the race with respect to the housing; increasing the temperature of the housing and race to a second higher level; creating a radial gap between the housing and the outer race; and fixing, with the retaining ring, a position of the race with respect to the housing.

2 Claims, 6 Drawing Sheets

(51) Int. Cl.
    *F16C 19/06*      (2006.01)
    *F16C 35/077*     (2006.01)
    *F16C 25/08*      (2006.01)
    *F16C 19/24*      (2006.01)
    *F16C 33/60*      (2006.01)
    *F16C 43/04*      (2006.01)
    *F16C 35/067*     (2006.01)

(52) U.S. Cl.
    CPC ............ *F16C 33/586* (2013.01); *F16C 33/60* (2013.01); *F16C 35/067* (2013.01); *F16C 43/04* (2013.01); *F16C 19/06* (2013.01); *Y10T 29/49689* (2015.01)

(56) References Cited

U.S. PATENT DOCUMENTS

| | | | | |
|---|---|---|---|---|
| 2,456,355 A * | 12/1948 | Aber | ............ | F16B 21/186 248/316.6 |
| 2,607,642 A * | 8/1952 | Gilbert | ............ | F16C 35/067 384/539 |
| 3,927,448 A * | 12/1975 | Jones | ............ | B30B 11/208 384/570 |
| 4,078,812 A * | 3/1978 | Beckershoff | ............ | F01D 9/00 277/543 |
| 4,089,570 A | 5/1978 | Markfelder et al. | | |
| 4,138,168 A * | 2/1979 | Herlitzek | ............ | F16C 35/067 384/537 |
| 4,316,678 A * | 2/1982 | F'Geppert | ............ | F16B 21/10 403/259 |
| 4,405,251 A * | 9/1983 | Kolchinsky | ............ | F16B 3/04 403/326 |
| 4,511,191 A * | 4/1985 | Kitamura | ............ | F16C 35/067 384/536 |
| 4,549,823 A | 10/1985 | Nichting | | |
| 4,647,230 A * | 3/1987 | Friedrich | ............ | F16C 19/185 384/486 |
| 4,775,273 A * | 10/1988 | Bauer | ............ | F16B 2/205 403/377 |
| 5,028,152 A * | 7/1991 | Hill | ............ | F16C 19/364 384/557 |
| 5,209,577 A * | 5/1993 | Swatek | ............ | E21B 4/003 384/220 |
| 6,688,774 B2 * | 2/2004 | Kullin | ............ | E06B 9/174 29/898.07 |
| 7,374,345 B2 * | 5/2008 | Ilie | ............ | F16C 33/7886 384/537 |
| 8,262,490 B2 * | 9/2012 | Langer | ............ | F16D 1/116 403/359.5 |
| 8,286,533 B2 | 10/2012 | Hurst et al. | | |
| 8,556,737 B2 * | 10/2013 | Yamauchi | ............ | B60B 27/00 464/178 |
| 8,740,467 B2 * | 6/2014 | Ravenna | ............ | B60B 27/0005 384/537 |
| 9,004,805 B2 * | 4/2015 | Changsrivong | ............ | A61F 2/78 29/896.92 |
| 2005/0105840 A1 * | 5/2005 | Muranaka | ............ | B60B 27/00 384/544 |
| 2006/0160651 A1 | 7/2006 | Petruska et al. | | |
| 2007/0107166 A1 * | 5/2007 | Kastner | ............ | F16B 21/18 24/16 R |
| 2008/0292393 A1 * | 11/2008 | Gilley | ............ | F16B 4/006 403/273 |
| 2009/0080824 A1 | 3/2009 | Joki et al. | | |
| 2011/0069922 A1 * | 3/2011 | Ravenna | ............ | B60B 27/0005 384/589 |
| 2012/0304813 A1 | 12/2012 | Hurst et al. | | |
| 2014/0130329 A1 * | 5/2014 | Changsrivong | ............ | F16B 21/073 29/428 |
| 2015/0226325 A1 * | 8/2015 | Bueter | ............ | F15B 15/1447 92/172 |
| 2015/0226326 A1 * | 8/2015 | Bueter | ............ | F15B 15/1447 403/376 |

FOREIGN PATENT DOCUMENTS

| | | |
|---|---|---|
| JP | 2003287043 | 10/2003 |
| JP | 2009008202 | 1/2009 |

\* cited by examiner

BEARING ASSEMBLY WITH A RETAINING RING AND METHOD THEREOF

CROSS-REFERENCE TO RELATED APPLICATIONS

This application claims the benefit under 35 U.S.C. §119 (e) of U.S. Provisional Patent Application No. 61/868,892, filed Aug. 22, 2013, which application is incorporated herein by reference in its entirety.

TECHNICAL FIELD

The present disclosure relates to a bearing assembly including a retaining ring disposed in respective grooves in a housing and an outer race for the bearing assembly and arranged to fix a position of the outer race with respect to the housing. The coefficient of thermal expansion of the retaining ring is at least equal to the coefficient of thermal expansion of the housing to ensure that the retaining ring remains in the groove in the housing when the bearing assembly is subjected to elevated temperatures.

BACKGROUND

Bearing assemblies, for example for internal combustion engines, are known to include a housing made of a first material and an outer race radially enclosed by the housing and made of a second material. For proper functioning of the bearing assembly, the outer race must be axially fixed with respect to the housing. Typically, the first material, such as aluminum or aluminum alloy, has a first coefficient of thermal expansion and the second material, such as steel, has a second coefficient of thermal expansion less than the first coefficient of thermal expansion. As a result, when the bearing assembly is subjected to elevated temperatures (for example, the internal combustion engine is operating), the housing expands radially outward more than the outer race, breaking contact between the housing and the outer race, which prevents axial fixing of the outer race with respect to the housing.

It is known to install the outer race in the housing with a tight interference or press fit that results in high compressive force between the outer race and housing. However, this tight fit increases the difficulty of installing the bearing assembly and causes distortion that interferes with operation of the bearing assembly. U.S. Patent Application Publication No. 2012/0304813 discloses the use of retaining clips that add a great deal of complexity to the bearing assembly as well as increasing the cost and dimensions of the bearing assembly. U.S. Patent Application Publication No. 2009/0080824 discloses a thermal compensating element that is in direct contact with a housing and the roller elements of the bearing assembly. The thermal compensating element compensates for thermal expansion by applying pressure directly to the roller elements, which can interfere with operation of the roller elements. U.S. Patent Application Publication No. 2006/0160651 discloses the use of a shim engaged with an axial surface of a bearing race to accommodate thermal expansion in a differential gear by axially expanding to compress the bearing race. U.S. Pat. No. 8,286,533 discloses the use of retaining clips that add a great deal of complexity to the bearing assembly as well as increasing the cost and dimensions of the bearing assembly. U.S. Pat. No. 4,549,823 discloses the use of an elastomeric ring between a housing and an outer race of a bearing assembly.

SUMMARY

According to aspects illustrated herein, there is provided a bearing assembly, including: a housing with a first circumferentially disposed groove; a bearing including an outer race with a second circumferentially disposed groove; and a retaining ring disposed within the first and second circumferentially disposed grooves.

According to aspects illustrated herein, there is provided a method of retaining a bearing, including: locating a first portion of an annular retaining ring within a first circumferentially disposed groove for an outer race of the bearing; installing a housing radially about the outer race such that the housing contacts the outer race; locating a second portion of the retaining ring within a second circumferentially disposed groove for the housing; bringing respective temperatures of the housing and the outer race to a first level; fixing, with contact between the outer race and the housing, axial and radial positions of the outer race with respect to the housing; increasing the respective temperatures of the housing and the outer race to a second level, higher than the first level; creating a radial gap between the housing and the outer race; and fixing, with the retaining ring, the axial and radial positions of the outer race with respect to the housing.

According to aspects illustrated herein, there is provided a bearing assembly, including: a bearing including an annular outer race constructed of a first material with a first coefficient of thermal expansion and including a radially outer circumferential surface and a first circumferentially disposed groove in the radially outer circumferential surface; an annular housing radially disposed about the bearing, constructed of a second material having a second coefficient of thermal expansion greater than the first coefficient of thermal expansion, and including a radially inner circumferential surface and a second circumferentially disposed groove in the radially inner circumferential surface; and an annular retaining ring including a first portion disposed within the first circumferentially disposed groove and a second portion disposed within the second circumferentially disposed groove.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
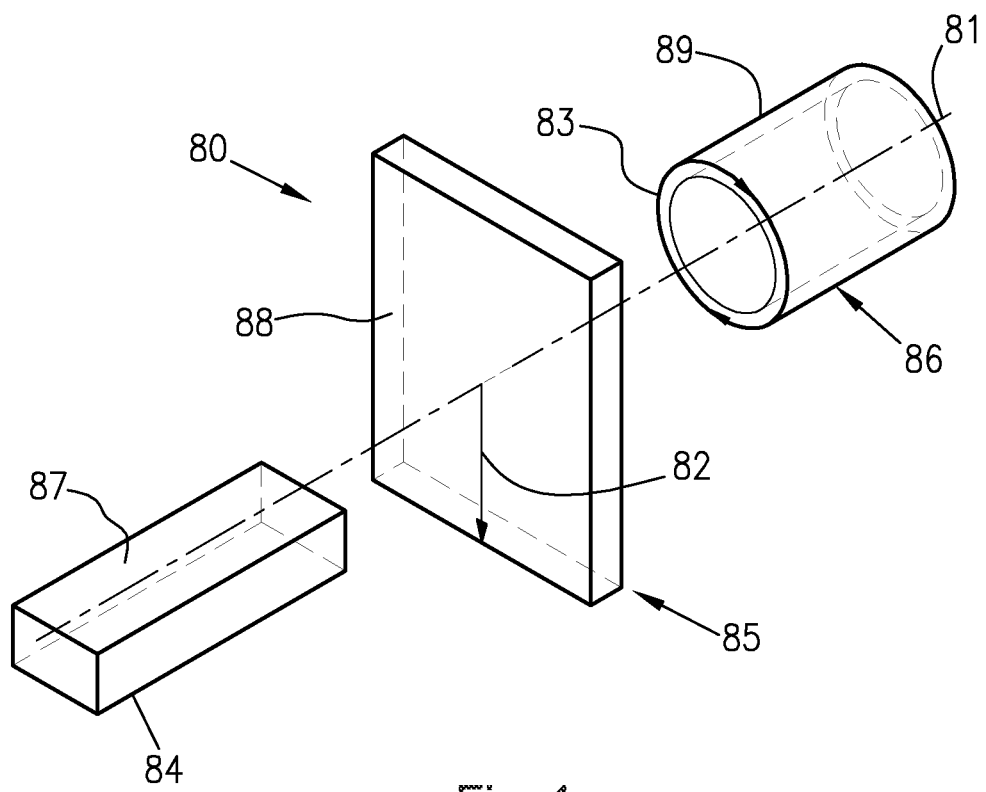
FIG. 1A is a perspective view of a cylindrical coordinate system demonstrating spatial terminology used in the present application.

FIG. 1A is a perspective view of cylindrical coordinate system 80 demonstrating spatial terminology used in the present disclosure. The present disclosure is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
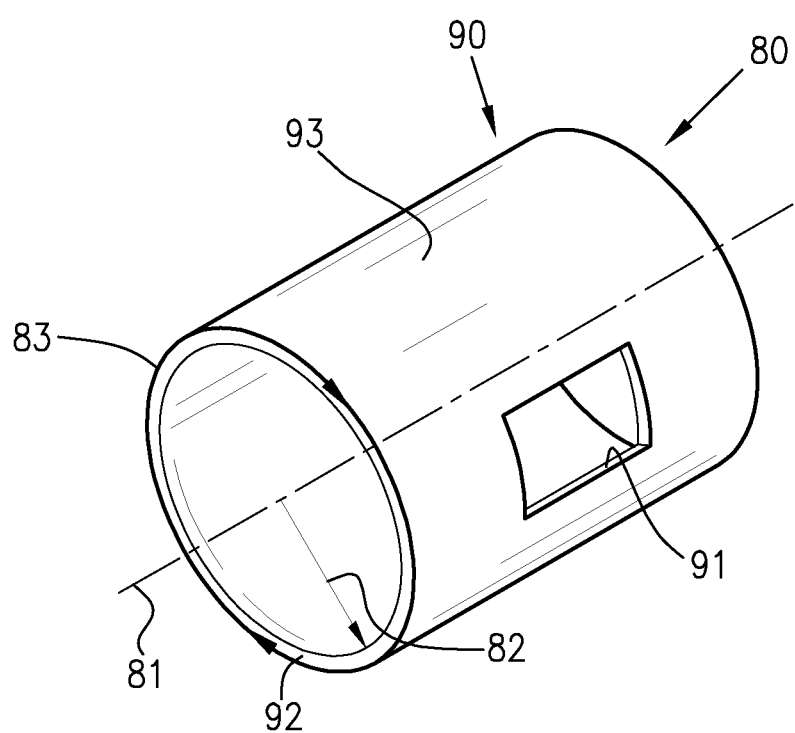
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present disclosure. Cylindrical object 90 is representative of a cylindrical object in a cylindrical coordinate system and is not intended to limit the present disclosure in any manner. Object 90 includes axial surface 91, radial surface 92, and circumferential surface 93. Surface 91 is part of an axial plane, surface 92 is part of a radial plane, and surface 93 is a circumferential surface.

Figure 2:
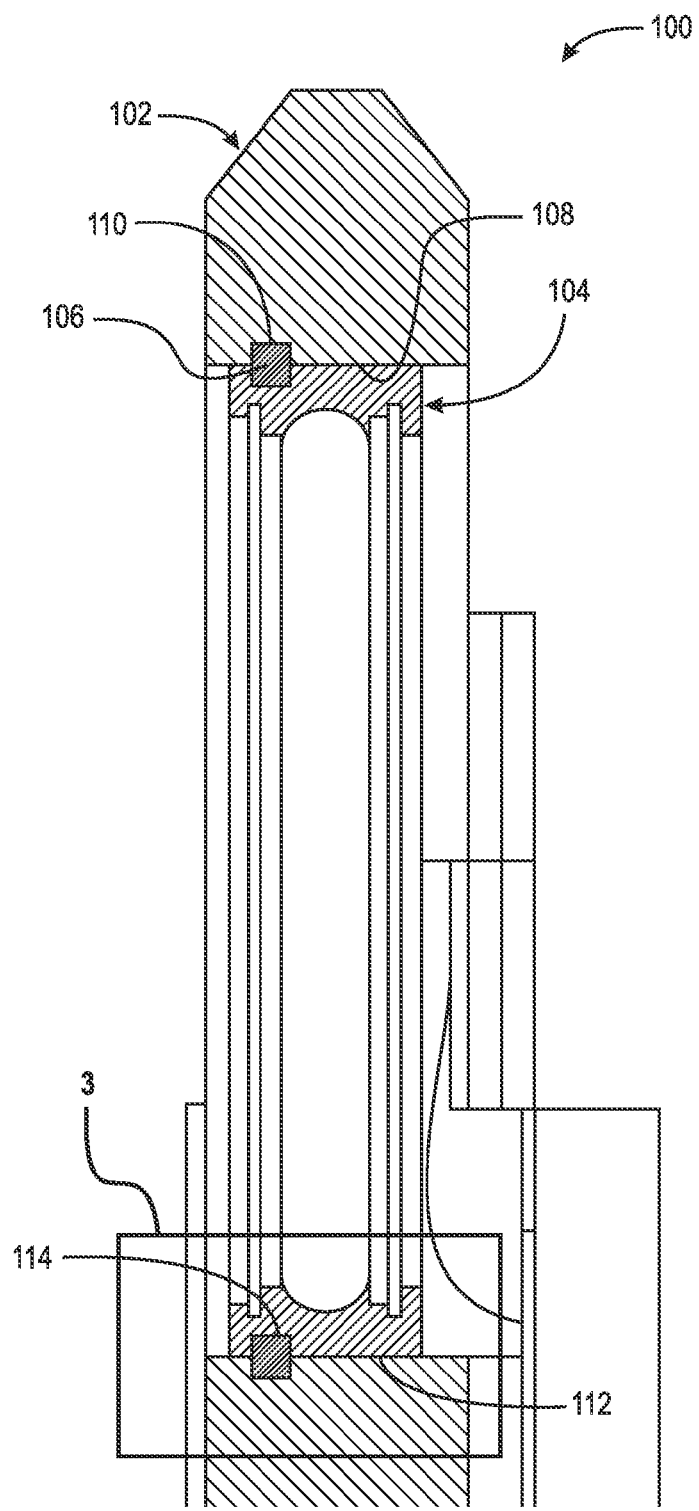
FIG. 2 is a partial cross-sectional view of a bearing assembly with a retaining ring.

FIG. 2 is a partial cross-sectional view of bearing assembly 100 with a retaining ring.

Figure 3:
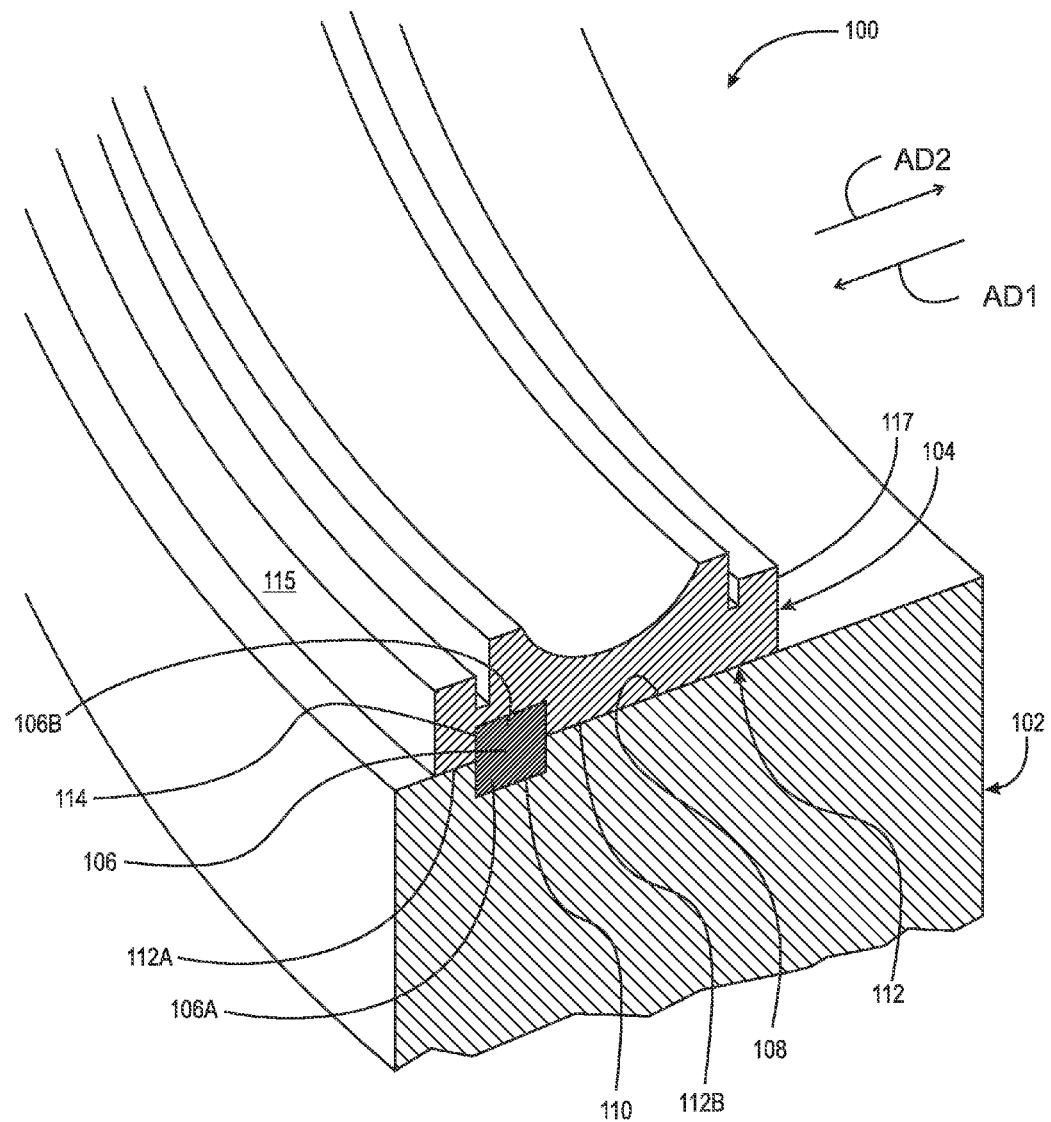
FIG. 3 is a perspective view of area 3 in FIG. 2.

FIG. 3 is a perspective view of area 3 in FIG. 2. The following should be viewed in light of FIGS. 2 and 3. Assembly 100 includes axis of rotation AR, annular housing 102, annular outer race 104, and annular retaining ring 106. Housing 102 includes radially inner circumferential surface 108 with circumferentially disposed groove 110. That is, groove 110 intersects surface 108. Race 104 includes radially outer circumferential surface 112 with circumferentially disposed groove 114. That is, groove 114 intersects surface 112. Portion 112A of surface 112 extends from groove 114 to axial end 115 of race 104 and portion 112B of surface 112 extends from groove 114 to axial end 117 of race 104. Ring 106 is disposed in grooves 110 and 112. For example, radially outermost portion 106A of ring 106 is disposed in groove 110 and radially innermost portion 106B of ring 106 is disposed in groove 114. Housing 102 is radially disposed about race 104. As further described below, the retaining ring axially and/or radially restrains the outer race with respect to the housing. By "circumferentially disposed" we mean that the respective groove extends continuously about the housing or race in the circumferential direction defined above and has a depth in the radial direction as defined above and a width in the axial direction as defined above. In an example embodiment, one or both of grooves 110 and 114 extend 360 degrees in the circumferential direction. In an example embodiment, one or both of grooves 110 and 114 extend less than 360 degrees in the circumferential direction. For example, circumferential ends of groove 110 are separated by a portion of surface 108.

In an example embodiment, housing 102 is constructed of a material, for example, aluminum or an aluminum alloy, with a particular coefficient of thermal expansion, and retaining ring 106 is constructed of a another material with a coefficient of thermal expansion equal to or greater than the coefficient of thermal expansion for housing 102. In an example embodiment, housing 102 and ring 106 are constructed of the same material. In an example embodiment, race 104 is constructed of a material, for example, steel, having a coefficient of thermal expansion less than either of the respective coefficients of thermal expansion for the housing and the ring.

Figure 4A:
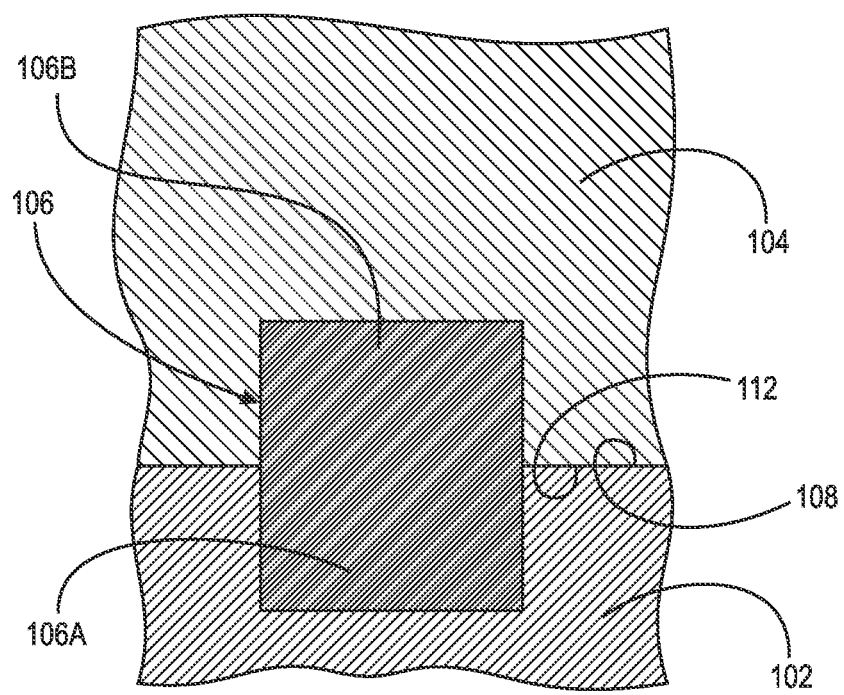
FIG. 4A is a detail showing the housing and outer race of FIG. 2 at a low temperature.

FIG. 4A is a detail showing the housing and outer race of FIG. 2 at a low temperature. The following should be viewed in light of FIGS. 2 through 4A. When housing 102 and outer race 104 are each substantially at a relatively low temperature, outer race 104 is axially and radially fixed, with respect to housing 102, by contact between housing 102 and outer race 104. For example, there is a compressive or frictional engagement between surfaces 108 and 112 which fixes the position of race 104 with respect to housing 102. Thus, as shown in FIG. 4A, there is no radial gap between surfaces 108 and 112. For example, when assembly 100 is used in an internal combustion engine, the low temperature can be considered a non-operating temperature for the engine, for example, the engine is not operating and is at ambient temperature, or the engine has begun operation, but has not yet heated up. The non-operating temperature also can be defined as a temperature at which thermal expansion of housing 102 and outer race 104 has not occurred or at which the respective thermal expansions of housing 102 and outer race 104 are substantially equal.

Figure 4B:
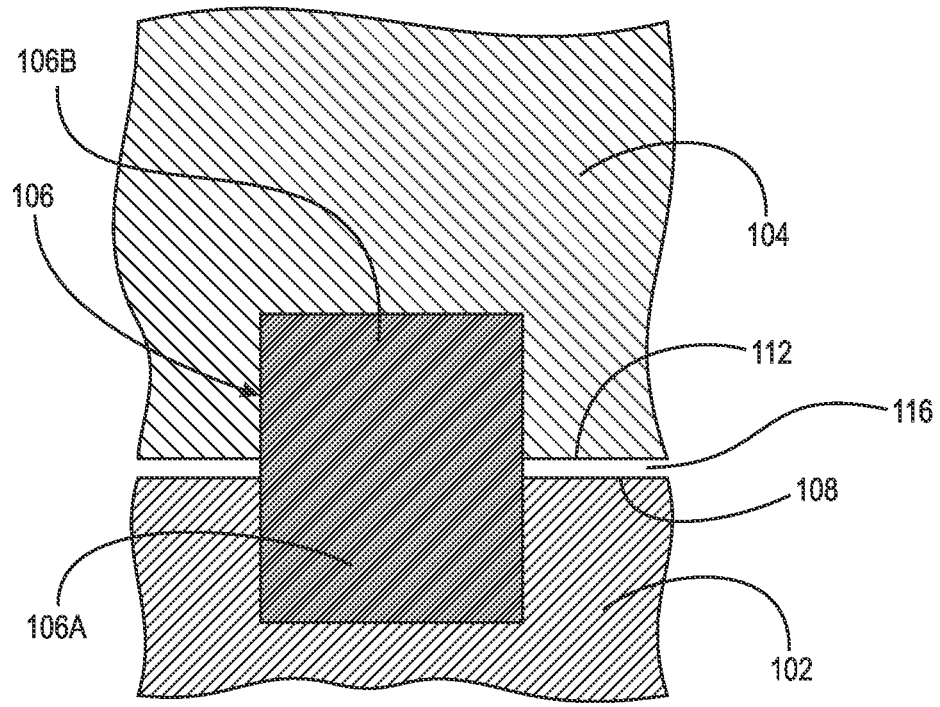
FIG. 4B is a showing the housing and outer race of FIG. 2 at a high temperature.

FIG. 4B is a detail showing the housing and outer race of FIG. 2 at a high temperature. The following should be viewed in light of FIGS. 2 through 4B. When housing 102 and outer race 104 are each substantially at a relatively high temperature, radial gap 116 is created between housing 102 and outer race 104 (between surfaces 108 and 112), and outer race 104 is axially and radially fixed, with respect to the housing 102, by outer race 104. For example, when assembly 100 is used in an internal combustion engine, the high temperature can be considered an operating temperature for the engine, for example, the engine is operating and the internal combustion process has raised the temperature of housing 102 and outer race 104 well above ambient temperature. The operating temperature also can be defined as a temperature at which thermal expansion of housing 102 has occurred or is occurring at a greater rate than the thermal expansion of outer race 104.

As a result of the increase in temperature and differences between the respective coefficients of expansion for housing 102 and outer race 104 (coefficient is higher for housing 102), housing 102 expands at a greater rate than outer race 104, creating gap 116. Due to gap 116, the compressive or frictional engagement of housing 102 and outer race 104 mentioned above is substantially nullified. Therefore, the engagement of housing 102 and outer race 104 is no longer sufficient to restrain outer race 104 with respect to housing 102 (fix axial and radial positions of outer race 104 with respect to housing 102). However, retaining ring 106 remains in contact with housing 102 and outer race 104 (disposed in grooves 108 and 112), to restrain outer race 104 with respect to housing 102.

For example, as housing 102 expands to create gap 116, portions 106A and 106B of remain in grooves 110 and 114, respectively. Further, since the coefficient of thermal expansion for ring 106 is greater than the coefficient of thermal expansion for race 104, portion 106A expands within groove 114 to increase contact pressure (compressive or frictional) in axial and/or radial directions between portion 106B and race 104, which more firmly fixes ring 106 with respect to race 104. Also, ring 106 expands radially outward, ensuring that portion 106A remains disposed in groove 110. In an example embodiment in which the coefficient of thermal expansion for ring 106 is greater than the coefficient of thermal expansion for housing 102, portion 106A expands within groove 110, increasing contact pressure between portion 106B and housing 102 in axial and/or radial directions. This increase in contact pressure further facilitates the fixing of ring 106 with respect to housing 102 and therefore, the fixing of race 104 with respect to housing 102.

Figure 5:
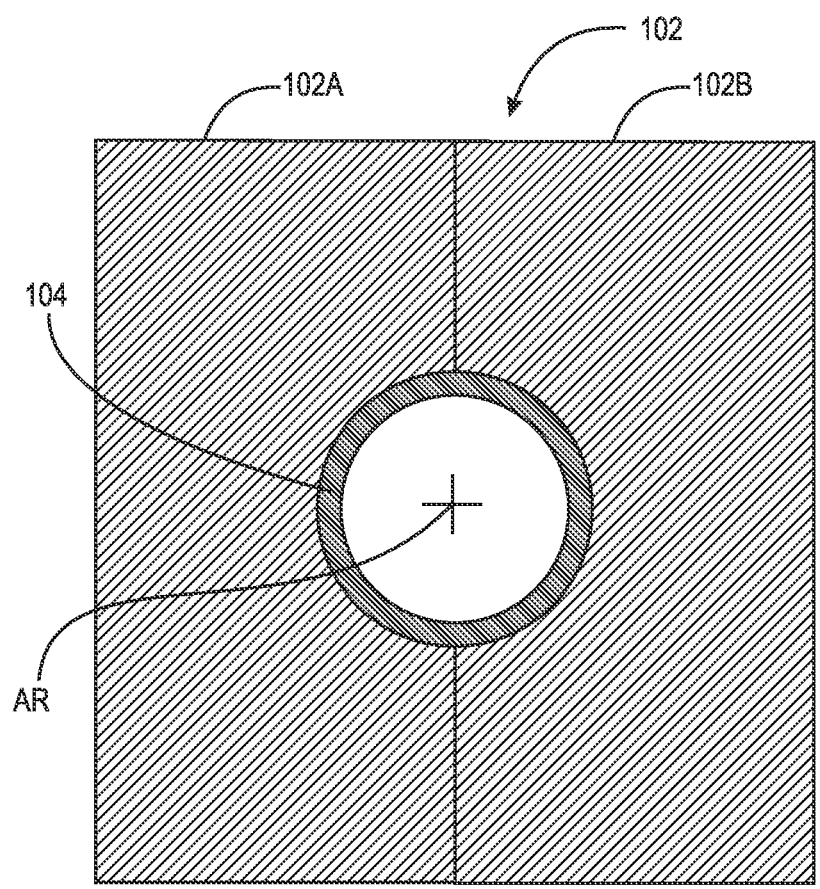
FIG. 5 is a schematic front view of a bearing assembly with a retaining ring showing a two-part housing; and, FIG. 6 is a partial cross-sectional view of a bearing assembly with a retaining ring.

FIG. 5 is a schematic front view of bearing assembly 100 with a retaining ring showing a two-part housing. The following should be viewed in light of FIGS. 2, 3, and 5. In an example embodiment, housing 102 includes separate portions 102A and 102B fixedly connected to each other by any means known in the art. Portions 102A and 102B facilitate fabrication of assembly 100. For example, ring 106 can be fabricated with a discontinuity to enable ring 106 to be radially expanded to pass over race 104 to slide into groove 114. Portions 102A and 102B can then be placed together such that groove 110 encloses ring 106.

Figure 6:
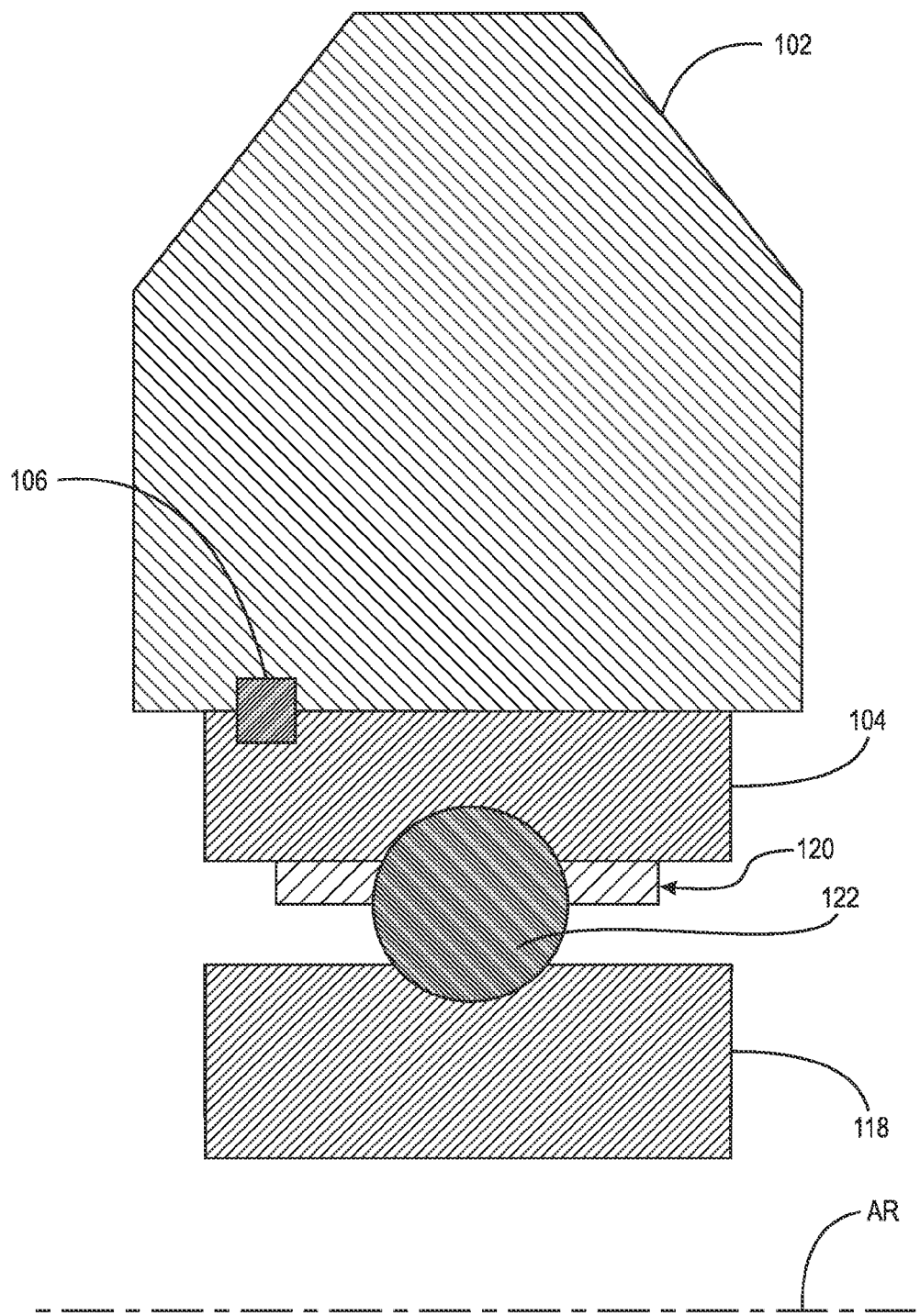

FIG. 6 is a partial cross-sectional view of bearing assembly 100 with a retaining ring. In FIG. 6, assembly 100 is shown in an example configuration with inner race 118, cage 120, and roller element 122. It should be understood that assembly 100 is not limited to use with the configuration of FIG. 6.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:
1. A bearing assembly, comprising:
a bearing including an annular outer race:
  constructed of a first material with a first coefficient of thermal expansion; and, including:
    a radially outer circumferential surface; and,
    a first circumferentially disposed groove in the radially outer circumferential surface;
an annular housing:
  radially disposed about the bearing;
  constructed of a second material having a second coefficient of thermal expansion greater than the first coefficient of thermal expansion; and,
  including:
    a radially inner circumferential surface; and,
    a second circumferentially disposed groove in the radially inner circumferential surface; and,
an annular retaining ring including:
  a first portion disposed within the first circumferentially disposed groove; and,
  a second portion disposed within the second circumferentially disposed groove, wherein the retaining ring is constructed of
a third material, different from the first material, with a third coefficient of thermal expansion equal to the first coefficient of thermal expansion.
2. The bearing assembly of claim 1, wherein the retaining ring is arranged to axially and radially restrain the outer race with respect to the housing.

* * * * *